US005478422A

United States Patent [19]
Bright et al.

[11] Patent Number: 5,478,422

[45] Date of Patent: Dec. 26, 1995

[54] COMPUTER CONTROLLED TURRET TYPE LABELING MACHINE

[75] Inventors: Lyn E. Bright; Svatoboj Otruba, both of Ceres, Calif.

[73] Assignee: B & H Manufacturing Company, Inc., Ceres, Calif.

[21] Appl. No.: 122,857

[22] Filed: Sep. 16, 1993

[51] Int. Cl.$^6$ .................. B32B 31/00

[52] U.S. Cl. .................. 156/64; 156/351; 156/364; 156/447; 156/450; 156/567

[58] Field of Search .................. 156/350, 351, 156/362, 363, 364, 447, 450, 458, 566, 567, 64

[56] References Cited

U.S. PATENT DOCUMENTS

| | | | |
|---|---|---|---|
| 3,601,587 | 8/1971 | Thiede | 235/92 CC |
| 3,791,894 | 2/1974 | Mistarz | 156/362 X |
| 3,801,408 | 4/1974 | Kuring et al. | 156/552 |
| 4,108,709 | 8/1978 | Hoffman | 156/446 |
| 4,108,710 | 8/1978 | Hoffman | 156/450 |
| 4,108,711 | 8/1978 | Hoffman | 156/497 |
| 4,181,555 | 1/1980 | Hoffman | 156/265 |
| 4,221,144 | 9/1980 | Diesch et al. | 83/27 |
| 4,242,167 | 12/1980 | Hoffman | 156/357 |
| 4,264,957 | 4/1981 | Pautzke | 364/469 |
| 4,293,774 | 10/1981 | Pongracz | 250/548 |
| 4,316,566 | 2/1982 | Arleth et al. | 226/2 |
| 4,361,260 | 11/1982 | Hanlan | 226/30 |
| 4,384,500 | 5/1983 | Friberg | 83/74 |
| 4,519,868 | 5/1985 | Hoffman | 156/353 |
| 4,552,608 | 11/1985 | Hoffman et al. | 156/351 |
| 4,639,287 | 1/1987 | Sakura | 156/74 |
| 4,994,135 | 2/1991 | Orlandi | 156/362 |
| 5,121,827 | 6/1992 | Ribordy | 156/567 X |
| 5,259,913 | 11/1993 | Stover | 156/447 X |
| 5,326,422 | 7/1994 | Kronseder | 156/447 X |

FOREIGN PATENT DOCUMENTS

| | | |
|---|---|---|
| 0009739 | 4/1980 | European Pat. Off. . |
| 0011595 | 5/1980 | European Pat. Off. . |
| 0011967 | 6/1980 | European Pat. Off. . |
| 0074165 | 3/1983 | European Pat. Off. . |
| 0109266 | 5/1984 | European Pat. Off. . |
| 3015281 | 10/1981 | Germany . |
| 3137201 | 3/1983 | Germany . |
| 2074533 | 11/1981 | United Kingdom . |
| 2096795 | 10/1982 | United Kingdom . |

OTHER PUBLICATIONS

Gallus, "Instruction Manual," 1978 (and English Language Translation).

Gallus, "A New Module for Rational Label Manufacture: The Sheet Cutting Unit", 1978 (and English Language Translation).

*Primary Examiner*—David A. Simmons
*Assistant Examiner*—Paul M. Rivard
*Attorney, Agent, or Firm*—Flehr, Hohbach, Test, Albritton & Herbert; R. Michael Ananian

[57] ABSTRACT

A computer controlled turret type labeling apparatus having a label applying mechanism for applying labels to containers. The labeling apparatus has a turret having a motor for driving the turret and a sensor for providing turret status information to a controlling computer. The turret apparatus contains at least one labeling station. Each labeling station also has a motor and a sensor, the motor drives the labeling station and the sensor provides labeling station status information to the controlling computer. The computer is programmed to process status information in conjunction with prestored information relating to the characteristics of the labeling apparatus, containers, and desired labeling and generate suitable control signals for labeling apparatus operation. The computer is coupled to the turret motor and sensor and to each labeling station motor and sensor for processing status information received from the turret sensor and each labeling station sensor, and generating control signals to drive the turret motor and each labeling station motor, based on the received, processed information, to effect labeling of containers.

24 Claims, 8 Drawing Sheets

COMPUTER CONTROLLED TURRET TYPE LABELING MACHINE

BACKGROUND OF THE INVENTION

In a turret type of labeling machine such as that described in U.S. Pat. No. 4,108,709 and incorporated herein by reference, containers are supplied continuously to a rotating turret; each container, in turn, is clamped between an upper chuck and a lower chuck carried by the turret; the container, so clamped, is rotated orbitally about the central shaft of the turret to a label pick up station where it contacts the leading edge of a label carried by a label transport such as a rotating vacuum drum; the label is released from the vacuum drum and is wrapped around a container as the container is caused to spin about its axis; and with a label wrapped around, it is transported by the turret to a container release station where the labeled container is released from the turret. In this operation, it is necessary to rotate each container clamped between a pair of chucks orbitally about the axis of the turret and it is necessary to spin the container about its own axis tow rap a label about it.

In the aforesaid U.S. Pat. No. 4,108,709 the spinning of the container is achieved by, for example, a wheel fixed to and coaxial with the upper member of a pair of chucks and a pad which is concentric to the turret axis. The contact between this wheel and pad causes the respective chuck, and with it the container, to spin.

This means of spinning the containers is quite effective but is limited in many ways. For example, the container can spin in only one direction and its speed is fixed by the speed of the turret and by the radius of the wheel and the pad. Also, this method of spinning the container to wrap the label may be ineffective for containers having generally noncircular cross sections.

It is an object of the present invention to provide a more versatile means of operating such a turret type of labeling machine.

SUMMARY OF THE INVENTION

The difficulties and limitations mentioned above are greatly diminished by providing a computer controlled turret type labeling apparatus for controlling the label applying mechanism when applying labels to containers. The computer controlled turret type labeling apparatus has a motor driven turret within a container handling station and one or more sensors that provide information about the operational status of the turret. Each container handling station has a motor for driving the container handling station and one or more sensors that provide operational status information about the container handling station. A label applying mechanism such as a motor driven vacuum drum may also be provided having sensors to provide operational status information. A computer is coupled to the motors and sensors for processing the status information received and for generating control signals in response to the received signals to drive the motors and to effect correct labeling of containers. The sensors typically provide speed, direction and position information. The computer is programmed to process the status information in conjunction with prestored information, including information relating to the characteristics of the labeling apparatus, the size and shape of the containers, and the desired container labeling characteristics.

DESCRIPTION OF THE DRAWINGS

With reference to the accompanying drawing.

DETAILED DESCRIPTION OF THE PREFERRED EMBODIMENT(S)

The following relatively detailed description is provided to satisfy the patent statutes. However, it will be appreciated by those skilled in the art that various changes and modifications can be made without departing from the invention. The following description is exemplary, rather than exhaustive.

Figure 1:
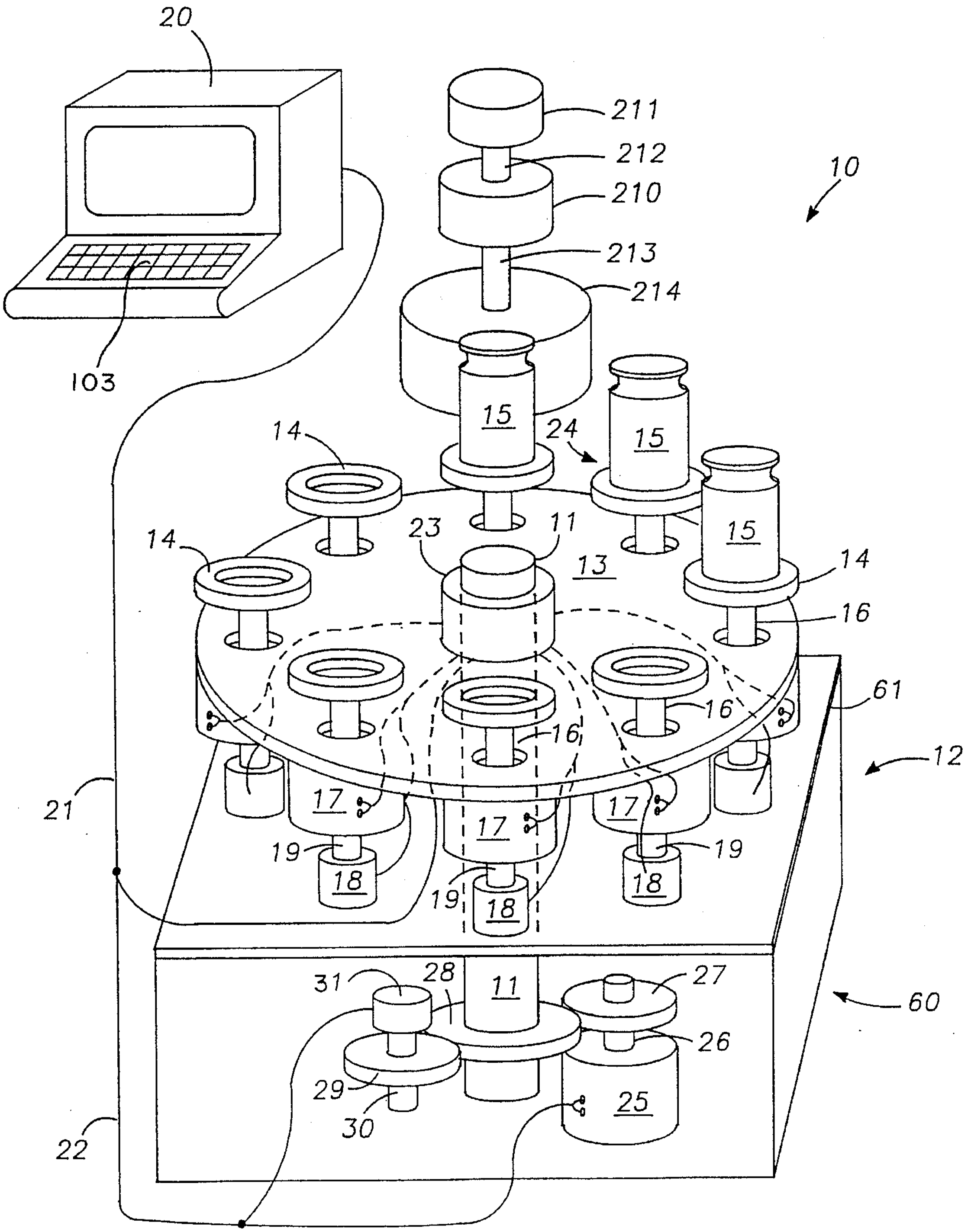
FIG. 1 is an illustration showing a perspective view of a turret arrangement of the preferred embodiment showing only the set of lower chucks.

Referring now to FIG. 1, the lower portion of a labeling turret 10 is shown. The labeling turret 10 is driven by shaft 11 mounted in the frame/housing 12 of the machine and is fixed to a plate 13. While a circular turret 10 is illustrated, a variety of container transports may be used in conjunction with this invention. For example, a linear transport or a transport defining a different predefined path may be used. A plurality of lower chucks 14 are provided which are spaced angularly about shaft 11 and each of which supports a container or other object such as shown at 15 between a container pick up station, where each container is sequentially associated with one of the plurality of chucks 14, and a container release station, where the association ends. Each chuck is fixed to a shaft 16 which is driven by a chuck motor 17. A sensor 18 is mounted to each motor 17 by a coupling 19. Sensor 18 as well as other sensors to be identified herein, may for example be encoders, of which various types are known in the art, or other types sensors. The shaft 16 may be coextensive with coupling 19. The function of chuck sensor 18 is described hereinafter.

There is an upper chuck (not shown) for each of the lower chucks 14 which is in axial alignment with the respective lower chuck. There are suitable container in feed and out feed means to introduce containers into the turret and to remove them from the turret after they have been labeled; and suitable label transport means are provided to supply labels to each container at a label release/applying (label application) station. Such means are described, for example, in U.S. Pat. No. No. 4,108,709. A simple embodiment of a vacuum drum 214 for holding a label 36 is shown. The vacuum drum 36 is connected by a drum shaft 213 to a drum motor 210 and a drum sensor 211. The vacuum drum, associated adhesive application device 201, and a label cut-off device comprise the labeling application station. The vacuum is provided by a suitable vacuum pump (not shown). Also, means are provided to move the upper of each pair of upper and lower chucks away from the lower chuck to permit entry of a container and downward movement to clamp the container in place between the upper and lower chucks. Suitable cam means for such function is described in U.S. Pat. No. 4,108,709, which also serves to lift each upper chuck to release a labeled container. A sensor and actuator arrangement capable of sensing upper chuck position and moving the upper chuck accordingly, may also be provided. The sensor and actuator arrangement would be similar to that discussed below with respect to turret 10 and modified as appropriate. The actuator may generally be an electric motor or air cylinder of which there are various types.

The turret shaft 11 is driven by an electric motor 25 through motor shaft 26, motor gear 27 and turret gear 28. A turret sensor 31 is also coupled to the turret shaft 11 opposite motor 25. A sensor gear 29 mounted through sensor shaft 30 to the sensor 31 is coupled to turret gear 28.

The motor 25 rotates the turret about the axis of shaft 11. Each chuck motor 17 rotates a chuck 14. During labeling, it is desirable to control the orbital speed of the turret 13, and thereby the orbital speed of the chucks 14 about the axis of the main shaft 11. It is further desirable to Control the speed and direction of rotation of each chuck 14 about its own axis. For example, assuming that the turret 13 is rotating counterclockwise, it may be desirable to rotate the turret 13 at a higher or lower speed, to spin a chuck 14 faster or slower, to spin a chuck 14 clockwise or counterclockwise and to commence and arrest spinning motion of a chuck 14 completely. It is generally desirable to commence spinning of each chuck 14 before its container touches the leading end of the label so as to match the linear speed of the label and the surface speed of container at point of contact, and in some applications to assure that the label is placed precisely in reference to a certain mark or feature of said container.

Figure 2:
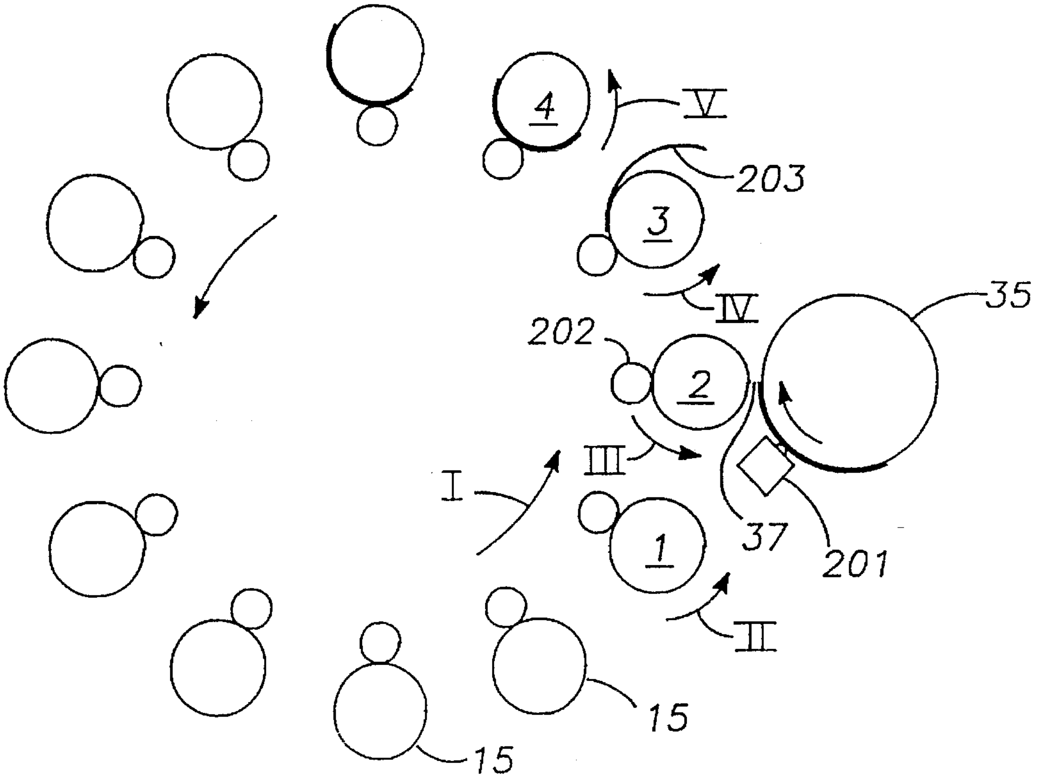
FIG. 2 is an illustration showing a diagrammatic view of one mode of operating such a turret.

Referring now to FIG. 2, four numbered containers are shown which are numbered 1, 2, 3 and 4 and which are transported by the turret 10. A vacuum drum is shown at 35 with a label 36 held on its cylindrical surface by vacuum, such label having its leading edge 37 touching container 2 at a tangent point. An adhesive is applied to portions of label 36, by an adhesive station 201. It is desirable to minimize slipping between the surface of the container 15 and the label carrying vacuum drum 35 during contact. As container 1 approaches the labeling station its motor 17 is commanded so that when it reaches the position as for container 2 it will be caused to spin by its motor 17 at a speed such that its orbital velocity about the axis of main shaft 11 (indicated by arrow I) and its spin velocity (indicated by arrow III) causes it to move forwardly at the same speed or slightly faster, and in the same direction as the label; that is to say, the velocities at the line of tangency of the container and the leading edge of the label are equal or slightly different for maintenance of proper tension. By this means, slippage between the leading edge of the label and the container is avoided or precisely controlled.

Referring to FIG. 2, container 3 has left contact with the vacuum drum and a loose, or what is known as a "flagging" or trailing end of the label 203 is being wrapped around a container. It is desirable that the flagging end be as short as possible to avoid interfering with labeling the next following container 2. Also, it may be desired to pack the chucks 14, and consequently the containers 15, as close together as possible. To achieve these goals motor 17 of the respective chuck 14 may be commanded so that container 3 will be caused to spin faster than container 2, at least until label wrapping is completed as shown by the container at position 4. The command may be for a specified period of time or for a specified number of rotations of the container. Once the label has been completely applied, the motor 17 may be commanded to decelerate or stop the rotation of the container. The control algorithm and coordination with the motors and sensors is described subsequently. An idler cylinder or alternatively a linear wiping arm, or other pressure applying device 202 may also be brought into contact with the spinning container 3 to springably press the label 36 into adhesive contact with the container 3. The idler cylinder 202 may be incorporated in conjunction with each chuck 14 as shown, or as a single station associated with etch vacuum drum 35. The need for such an additional pressure applying device will depend on such factors as the type of adhesive, the diameter of the container, and the labeling material. Other methods of pressing the label with adhesive to the surface of the container may also be used, for example an appropriately directed flow of air may be directed at the container to urge the label to the container surface.

While it is generally desirable to match the linear speed of the container and the label at the point of tangent contact, it may alternatively be desired to spin container 2 at a speed such that the tangent velocity of the container exceeds that of the label on the drum, thereby exerting a pull on the label.

Figure 3:
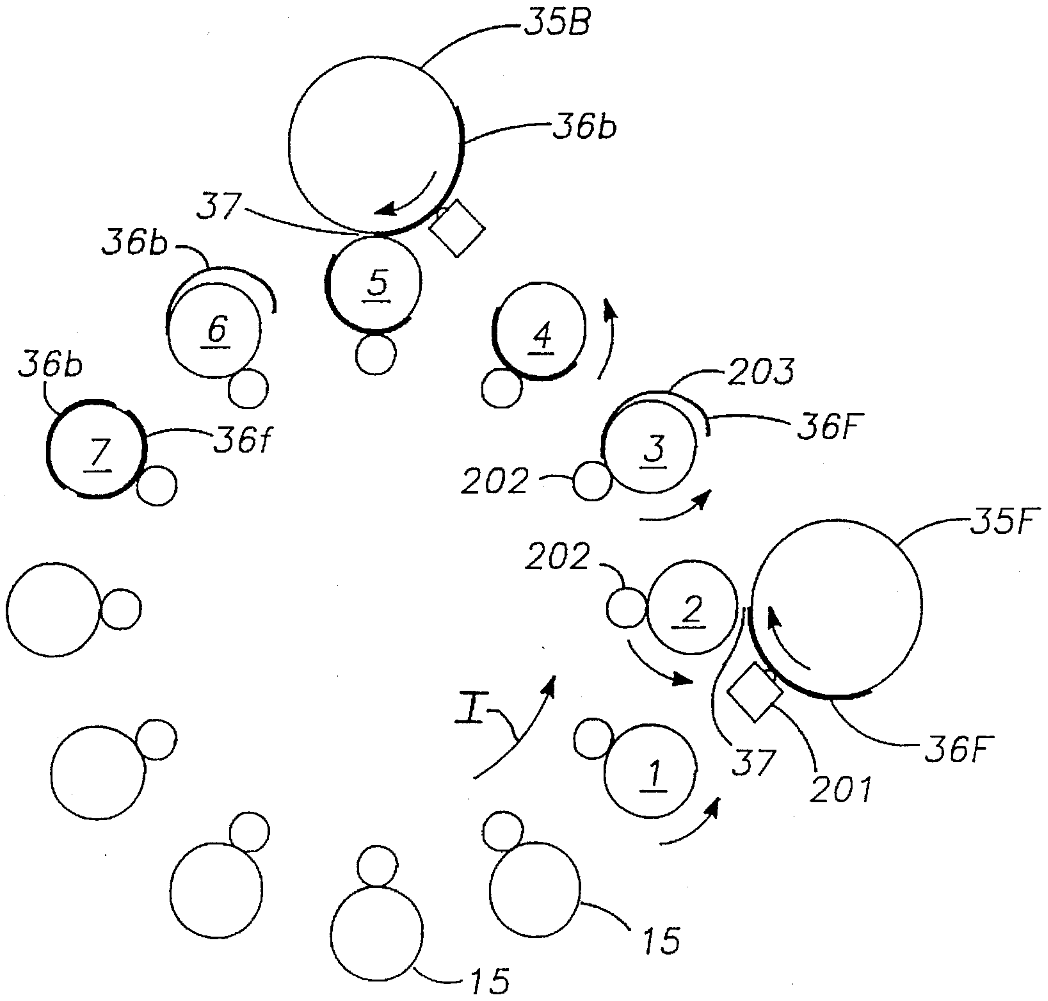
FIG. 3 is an illustration showing a diagrammatic view of another mode of operation in which front and back labeling are carried out.

Referring to FIG. 3, a front and back labeling operation is shown in which container 2 has a front label 36F applied to it by vacuum drum 35F and container 5 has a back label 36B applied to it by a vacuum drum 35B. The apparatus of FIG. 3 is substantially the same as that in FIG. 2 except that a second labeling station is present in addition to the first labeling station. The control system and algorithm is somewhat more complex for a multiple labeling station apparatus, and will be described in more detail subsequently. Assuming that the back label 36B is to be applied at a position 180° from the front label 36F, it will be necessary to change the orientation of the container with respect to the tangent point of the respective vacuum drums 35F and 35B by 180°. Container 4 represents a container at a position between the two labeling stations after the first label has been applied. This 180° spin or change in orientation may be accomplished by any odd multiple of 180°, e.g. the container may be caused to spin 3×180°, =540°, between the two labeling stations. This operation may be applied to labels which are at some relative angular orientation other than 180° apart, to the application of three or more labels, and to the application of labels to sides of a non-cylindrical container. In all cases the container is caused to rotate between the two labeling stations by the desired amount or a suitable multiple thereof.

In addition to the change in orientation, the container at 5 must also have a velocity so as to minimize slippage when the label 36B is applied as for a single labeling station apparatus. This requirement may readily be achieved as before. However, additional complexity arises when multiple labels are placed on a container. When the relative orientation or location of the two labels is important, both the orientation of the container relative to the vacuum drum 35B, and the velocity of the container must be at the desired values. This matching is achieved in spite of the intermediate acceleration of the container to facilitate label wrapping, and the deceleration necessary to match tangent speed at the vacuum drum 35B. A control mechanism to achieve this operation is described subsequently.

Another aspect of the invention relates to the labeling of containers which are not cylindrical. For example, containers having a rectangular cross-section or an oval cross-section. As for cylindrical containers, either single or multiple labeling may be provided. Chuck rotational speed can be varied during labeling in such a way that each point of the surface of the container, as it is making contact with the applied label, has a suitable speed to match the speed of the incoming label, or slightly different to maintain proper tension.

Figure 4:
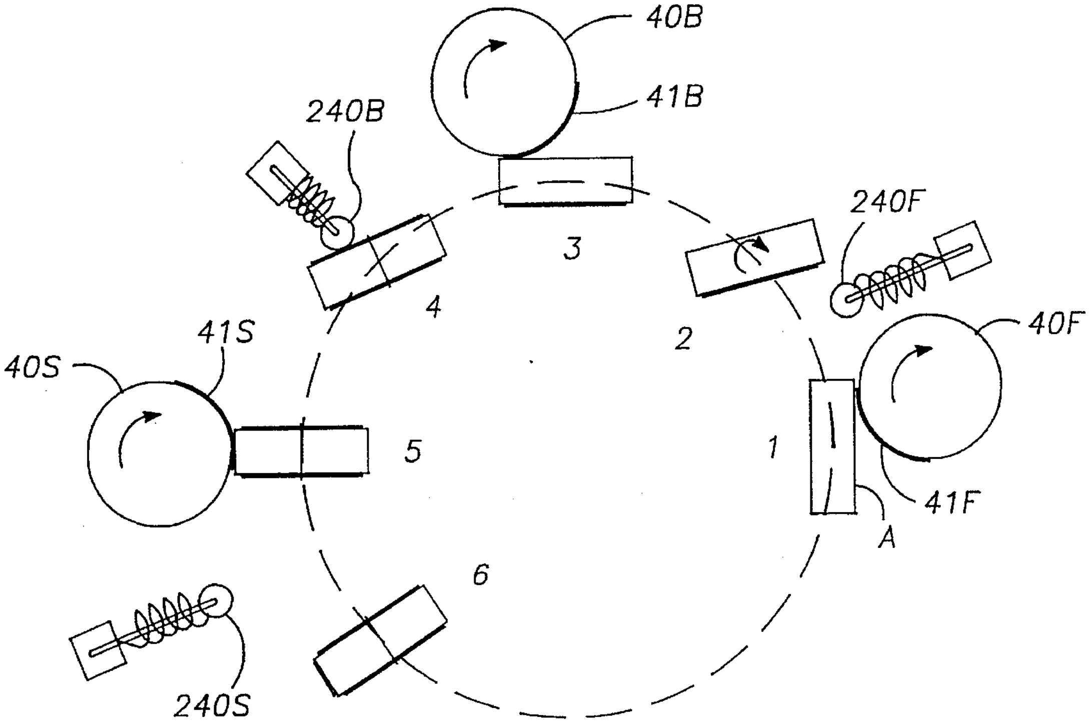
FIG. 4 is an illustration showing a diagrammatic view of a labeling operation carried out by means of the turret of the preferred embodiment for applying front and back labels to containers other than cylindrical containers.

Referring now to FIG. 4, a process is shown for multiple labeling of rectangular containers. The process for labeling rectangular containers is analogous to the process illustrated in FIG. 3 for cylindrical containers but more movements of the container between stations may be required. In FIG. 4, a front, back, and side labeling operation is shown in which a container 1 has a front label 41F applied to it by a vacuum drum 40F, container 3 has a back label 41B applied to it by a vacuum drum 40B, and container 5 has a side label 41S applied to it by a vacuum drum 40S. Assuming that the labels are to be applied on three different faces of the rectangular container, it will be necessary to rotate the container between vacuum drums 40F, 40B, and 40S. Containers 2 and 4 represent containers at intermediate points between labeling operations. Each label application process is completed between the labeling stations and the container is reoriented for the next operation. As for the cylindrical containers, some pressure or force may be required to urge each label with adhesive onto the surface of the container. This urging force may be by some pressure devices as before such as a springably mounted cylindrical roller 240F, 240B, 240S or by, for example, some directed flow of compressed air. The rectangular container may also be spun at a higher velocity between stations but such spinning by itself may be insufficient to adhere the label to the container for a rectangular container under some conditions because of the air flow disruption caused by the irregularly shaped container. When the container shape deviates substantially from a cylinder, it may be desirable to control the orientation of each container at each location as it traverses a turret revolution or more generally as it traverses the predetermined transport path. Steering of the container may be achieved by directing the container against a cylindrical roller 240B, as shown in FIG. 4. To achieve the above and other controls of motions a computer control system driven by computer 20 is provided and is described subsequently.

Referring again to FIG. 1, a perspective view of the computer controlled turret type labeling apparatus 10 of the preferred embodiment is shown. For better clarity in illustrating the function of the present invention, the turret assembly 10 is shown isolated from the remainder of the system. The unloading and loading of a container 15 onto and off of a turret type mechanism is generally known in the art. One method is taught by U.S. Pat. No. 4,108,709, issued to Hoffman. In the preferred embodiment, the turret arrangement 10 is connected through a plurality of control lines to a computer 20 via a plurality of interfaces. The control lines provide communication channels sufficient to sense the position of each sensor 18 and 31 and to excite each motor 17 and 25 either directly or through output drivers to effectuate the desired operation. For example, two or more electrically conductive wires may be provided from each motor and sensor to the computer controller or a multiplexing arrangement or an electrical bus arrangement having fewer wires may be used. Some motors and or sensors may require additional wires or a common ground conductor may be employed to reduce the number of wires needed to communicate. These methods of communication and control are known in the art. The computer 20 is programmed to process signals received from sensors 31 and 18 and to generate appropriate response signals to drive motors 25 and 17 mounted in the turret assembly.

Focusing on the turret 10 assembly, a central turret shaft 11 is provided to turn a turret plate 13. The turret shaft 11 is driven by a motor 25. A drive shaft 26 extends from the motor 25 and is utilized to drive turret shaft 11. The portion of the labeling apparatus containing the motor 25, motor gear 27 and front gear 28, and related components is in the drive motor housing 60. It is separated by a partition 61 from the turret plate 13 and container handling stations 24.

Also located in the drive motor housing 60 is a turret shaft sensor 31. As the turret shaft 11 rotates, the motion of the turret shaft 11 is transferred from turret gear 28 to sensor gear 29. This motion is sensed by sensor 31. The sensor 31 generates a plurality of electrical signals representative of the direction, speed and angular position of the turret shaft 11 in response to the sensed motion and position of shaft 30. For some sensors, the electrical signals generated are pulses which may be coded to represent the direction, speed, and angular position of the shaft. This signal is propagated across control lines 22 and 21 to the computer 20.

A turret plate 13 is coaxially mounted to the turret shaft 11. A plurality of container handling stations 24 are connected to the turret plate 13. Each of these stations 24 contains a motor 17, a rotary shaft 16, a sensor 18 and a container mounting surface (or chuck) 14. The motors 17 are mounted on to the bottom of the turret plate 13 through means well known in the art. The rotary shaft 16 extends from motor 17 through a shaft opening in the turret plate 13. A sensor 18 is connected at the base of the rotary shaft 16 (through a sensing coupling 19) for monitoring the speed, angular position and direction of rotation of rotary shaft 16, and thereby a container 15 located thereon.

In the preferred embodiment, the sensor 18 is a rotary optical encoder. Magnetic flux pick-up type sensors may also be used but may not be as precise as optical devices. Also, some types of motors have an integral position encoder so that a single unit may provide the motor and sensor functions. The optical encoder 18 reads the position of the rotary shaft 16 at a plurality of evenly spaced increments about a complete 360 degree rotation of the rotary shaft 16. For example, an optical encoder having 500 evenly spaced angular increments about a complete 360-degree rotation of the shaft may be used. The greater the number of increments, the greater the precision to which the speed, direction, and angular position may be sensed.

An electrical signal propagating station 23 is mounted on top of the turret plate 13 about drive shaft 11. This station 23 permits continuous electrical signal propagation between lines running from the computer 20 to rotating stations 24 and vice versa. Methods and apparatus for providing the electrical signal propagating station 23 are generally known in the art.

The sensor is provides the computer 20 with precise container 15 angular position information at any given instant of time. The location and angular orientation are identified with respect to a fixed point of shaft angular orientation which is precalibrated in the position sensor 18, as discussed above. Given exact container position information, the computer 20 may send out appropriate signals to the motor 17 to move the chuck 14 through a desired motion. These motors 17 may be AC or DC motors depending upon operating conditions, and other relevant considerations.

Stepper motors may also be used. The electrical motors 17 rotate the chucks 14 (and containers 15 thereon) at a specific speed, in a specific direction and for a specified duration based upon an excitation signal or control signal provided to motor 17 by the computer 20. A suitable motor for this embodiment is selected based on the characteristics of the chuck 14 and the container 15, and particularly on the required output power, velocity characteristics, torque requirements, and operating environment.

The computer 20 of the preferred embodiment allows an operator to easily modify labeling parameters as opposed to the painstakingly slow process of modifying the mechanical labeling apparatus of the prior art.

A general purpose computer of the type referred to as an IBM compatible computer having sufficient processor speed may be configured with appropriate interfaces to sense and control the labeling apparatus. Methods of control are known in the art and are taught in standard reference texts such as *Incremental Motor Control—Volume I—DC Motors and Control Systems* edited by Benjamin C. Kuo and Jacob Tal, published by the SRL Publishing Co.

Figure 5:
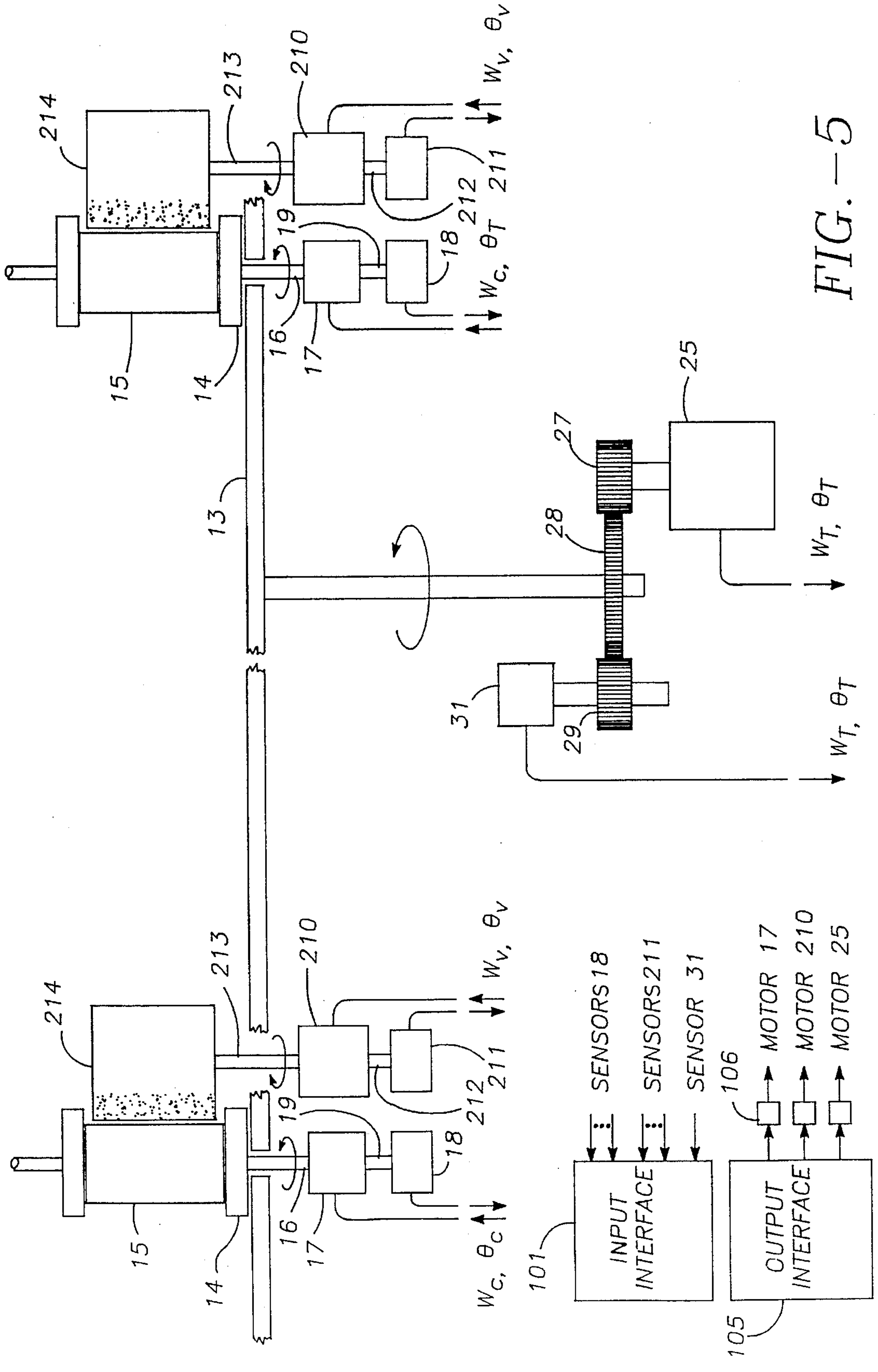
FIG. 5 is an illustration showing a diagrammatic view of selected components such as motors/actuators, sensors, control lines, and interfaces of the computer controlled turret assembly.

Referring to FIG. 5, there is shown an illustration of the components which form part of the computer control system. The components are identified by the same reference numerals as appear in FIG. 1. Of particular interest are turret motor 25, turret sensor 31, a plurality of chuck motors 17, chuck sensors 18, vacuum drum motors 2 10, and vacuum drum sensors 211.

For each motor 25, 17, 210 there is associated a command signal comprising a commanded angular velocity $\Omega$ and a commanded angular position $\Theta$. For each sensor 31, 18, 211 there is associated a sensor signal comprising a measured angular velocity $\omega$ and a measured angular position $\theta$. The commanded and measured signals are provided or received depending on the characteristics of the particular devices. The commanded and measured angular velocities include both magnitude (speed) and direction.

Figure 6:
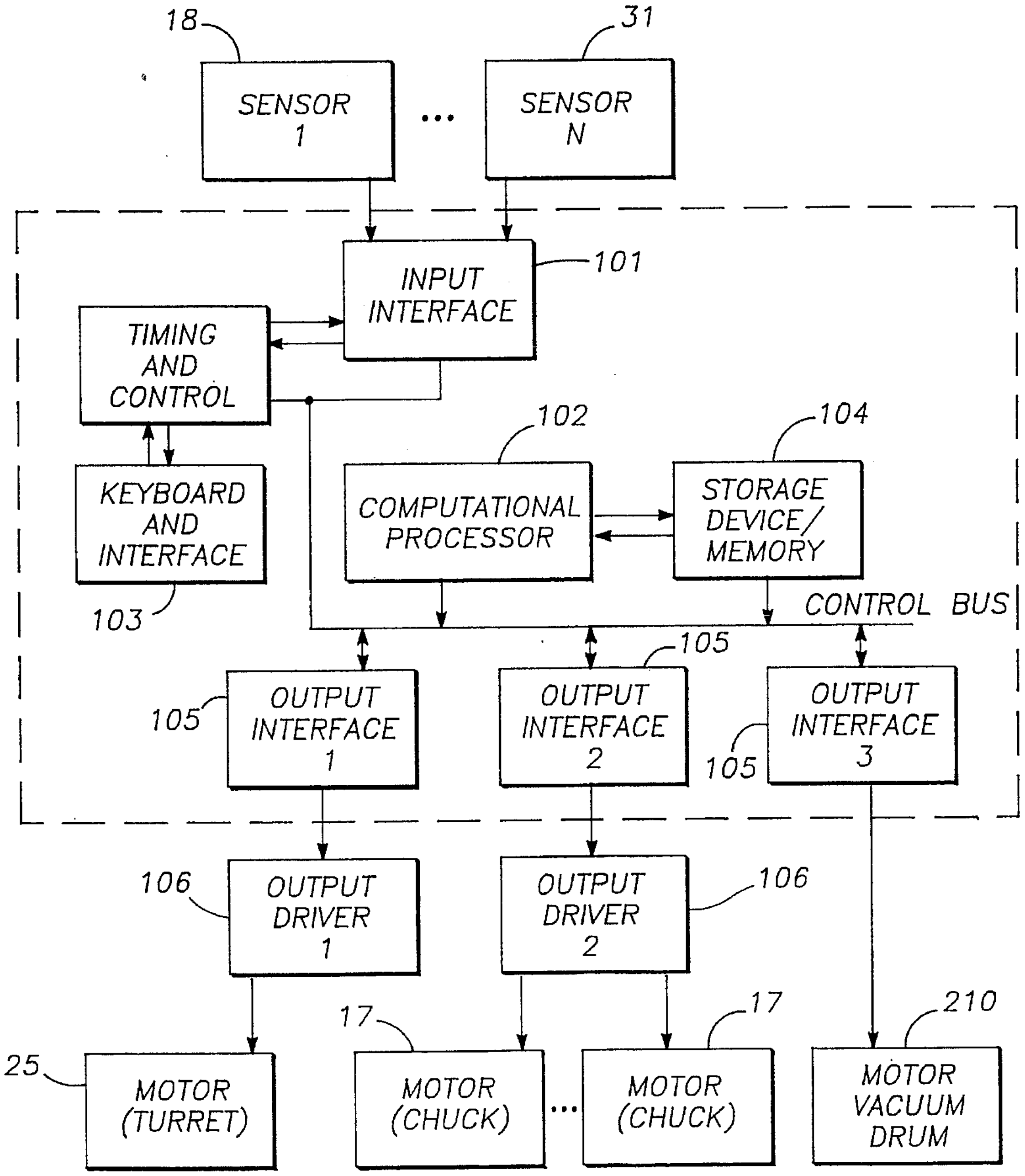
FIG. 6 is an illustration showing a simplified hardware block diagram of the computer, interfaces, actuators/motors, and sensors of the preferred embodiment.

Referring to FIG. 6, a simplified hardware diagram of the computer, interfaces, actuators, and sensors of the preferred embodiment is illustrated. Not all aspects of the digital computer, the general structure of which is well known in the art, are illustrated.

Information in the form of electrical signals is input to input interface 101 of computer 20. The interface 101 is comprised of signal conditioning hardware and its operation is under the control of the software process control algorithm and the computer operating system. The interface may comprise analog-to-digital conversion circuitry when the sensors 18 and 31 produce analog signals and a digital computer is used. Signals from other sensors indicating the condition of other components of the labeling apparatus may also be received at the interface. For example, the status of other components of the labeling apparatus may be provided to the interface using suitable sensors. The upper chuck (not shown) position, the vacuum drum status including velocity and angular orientation, and label supply status may be provided, for example. In the interface 101 the input signals may be filtered to suppress noise, processed to identify source sensor, and the data itself may be validated against predetermined characteristics to verify that it is in the proper range and not clearly erroneous.

The input interface 101 may be a parallel interface wherein several signal channels are processed substantially simultaneously, or it may be a serial interface wherein signals are accepted and processed sequentially. Methods of interfacing devices, including sensors, to computers are well known in the art.

After the interface 101 has received the sensor inputs and performed initial processing, the interface provides labeling machine status information to the computer 20 usable by subsequent processing stages. When computer 20 is a digital computer, the status information is generally provided in the form of a plurality of status words, encoded as binary bits. Analog computer control may also be used in which case the status information may be a plurality of voltage levels on different control lines.

The status information is read by a computational processor block 102 which performs logical and arithmetic operations based on the status information, stored parameters form storage device 104, and operator inputs from keyboard 103 when necessary or desirable. The logical and/or arithmetic processing steps or algorithm may be input by an operator from the keyboard 103 or may be retrieved from a storage device 104, such as a computer memory and/or computer disc device. A suitable processing algorithm will define the characteristics of a plurality of control signals based on several system parameters including: the geometry of the turret plate 13 and chucks 14, the sensed position, rotational direction, and speed of the turret plate 13 and chucks 14, a mathematical description of the subject container 15 in a given chuck 14, the dimensions of each label to be applied, the location relative to the container 15 where label is to be applied, a description of the container's motion to achieve the desired labeling, and other parameters related to the characteristics of the overall apparatus as necessary.

The processing algorithm will utilize this information and the specified operation in order to compute appropriate control signals to the various motors 17 and 25 and other components such as the vacuum drum, to achieve the desired operation. The logic and arithmetic processor will also validate the computed control signal parameters to verify that they are not clearly erroneous based on the current status of the apparatus, physical capabilities of the components including motors 17 and 25, and desired operation. Suspect conditions will be indicated by error conditions. In general, some of the computations can be performed and the results pre-stored so that only a minimum number of computations need be performed during operation of the labeling machine.

The control characteristics are provided by a plurality of output status or control words generated under software control in the computational processor 102, and provided to a plurality of output interfaces 105. In most instances, a single output interface 105 will be sufficient, in other instances it may be beneficial to provide more that one interface, such as separate interfaces to control turret motor 25, and chuck motors 17.

The output interface 105 may directly generate the appropriate output analog or digital (pulse) signal based on the information provided by processor 102 to excite motors 17 and 25 to the desired motion. In particular, a commanded speed, direction, and position will be computed for each motor 17 and 25. The output interface 105 may comprise a plurality of digital-to-analog converters to translate the digital control signals into analog electrical signals suitable for the motors 17 and 25. The output interface 105 may also comprise amplification stages. In other instances it may be desirable to interpose an output driver 106 between the interface 105 and the motor 17 and/or 25. The additional output diver is required only when the required motor exciting signal has a larger voltage or current than is possible or desirable to provide directly from the output interface 105, or where the control signal may more effectively be generated external to the computer or its interface. For example, the output driver 106 may be an amplifier, or may be a voltage controlled oscillator which generates a variable frequency pulse signal for a stepper motor. Generally, the output motor signals are analog signals less than a few amperes and fewer than 10 volts; however, the use of motors requiring larger voltage or current signals is within the scope of this invention.

In one embodiment of the invention, direct-current (DC) type motors are employed for motors 17 and 25. In this embodiment the output interface 105, or the optional output driver 106, provide a selectable amplified constant voltage, zero-frequency analog signal to each DC motor.

In an alternative embodiment, alternating-current (AC) type motors are used for motors 17 and 25. In this case, an alternating (non-zero frequency) current or voltage signal is used to excite or control each motor 17 and 25.

In another embodiment of the invention, stepper type motors are used for motor 17 and 25. The signals used to control the motors are pulses, wherein each pulse corresponds to a partial rotation of the motor shaft. Variation in motor velocity may be effectuated by increasing or decreasing the pulse frequency. Acceleration characteristics of the motor may be modified by ramping the pulse frequency in accordance with a desired acceleration ramp characteristic.

Different types of motors may be combined in a single embodiment of the invention as long as the software program controlling the process and the interfaces are configured appropriately.

Upon movement of the turret 13 and chuck 14 in response to the control signals, new sensor signals from sensors 18 and 31 are received at the input interface block 101, beginning the process again. The system is sampled sufficiently frequently to maintain control of operation. The required sampling rate is a function of the dynamics of the system, including the speeds of the turret and chuck motors.

The labeling apparatus is compatible with various types of motors however, the preferred embodiment incorporates stepping motors. Stepping motors are particularly advantageous for this application because the angular velocity and the angular position respond directly to input commands. A stepping motor may be made to move from a known angular position to a commanded angular position by a simple command, such as a sequence of pulses. The velocity may also be commanded in a similar manner. Stepping motors may also be held at a desired angular position by issuing appropriate commands, without additional motor shaft breaking components and without jitter that may occur in servo controlled feedback loop systems without stepper type motors.

The stepper motor is one component of a stepper motor system. The stepper motor control system which activates the proper coil or coils within the motor to make the motor rotor move or stop as desired is important to its operation. The desired motor operation is achieved by energizing selected strator coils in sequence which cause a corresponding movement (or alignment) in the rotor. The controlled acceleration and deceleration of a stepper motor is achieved by ramping or slewing the speed, first with slow step rates and then to higher step rates. When decelerating a stepping motor the high step rate is gradually reduced. For some stepping motors, one pulse causes the motor to move through a fractional part of a full revolution. For a stepper motor having 500 steps in 360 degrees, the motor shaft rotates 360/500=0.72 degrees/step. The speed of such a stepping motor is controlled by the pulse or step frequency. This ramping reduces oscillations and potential loss of synchronism that might result from sudden changes in the pulse frequency. Motor and motor control technology are well known in the mechanical arts.

Figure 7A:
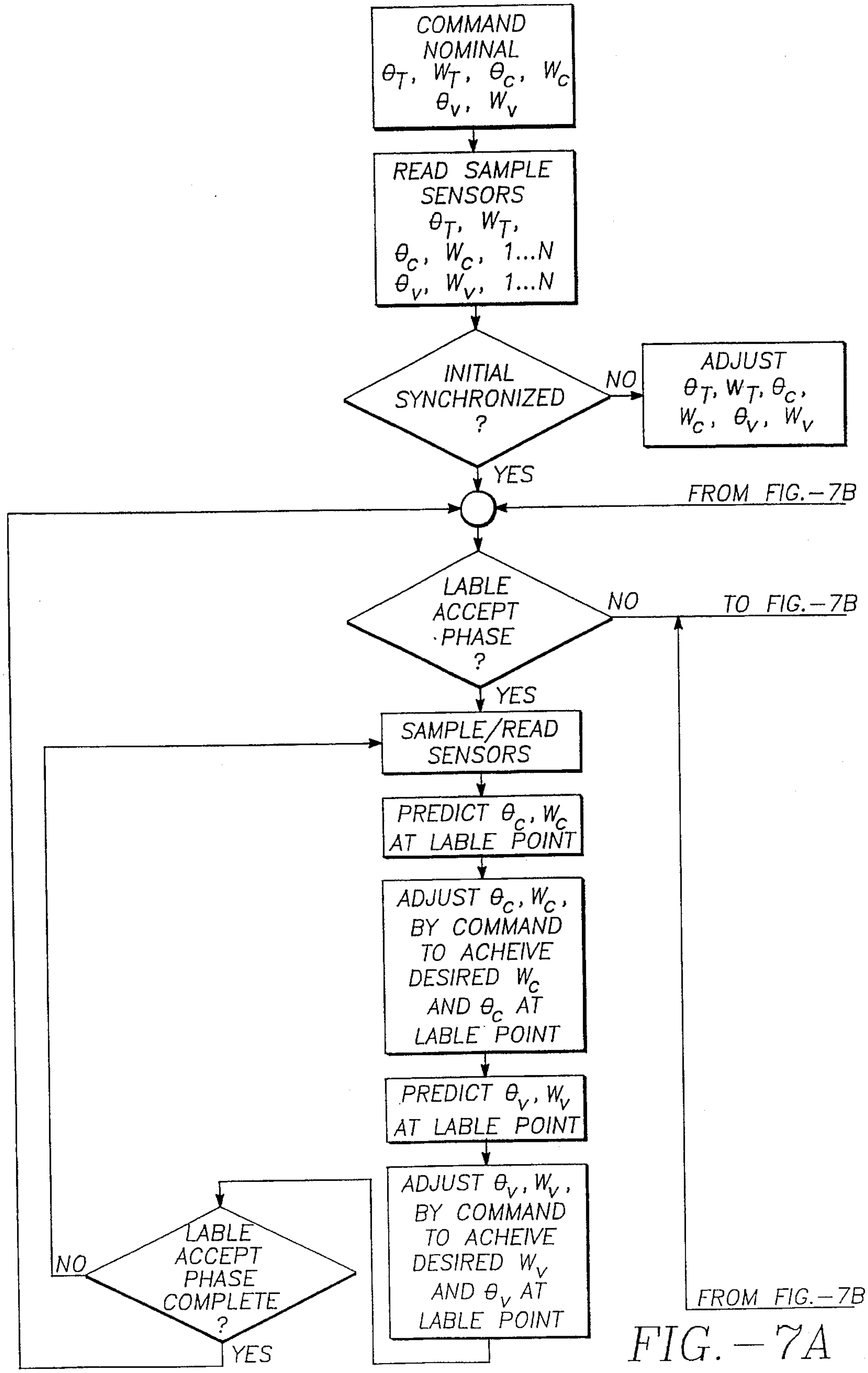
FIG. 7 is an illustration showing a flow chart of an algorithm to control the operation of the labeling apparatus.
Figure 7B:
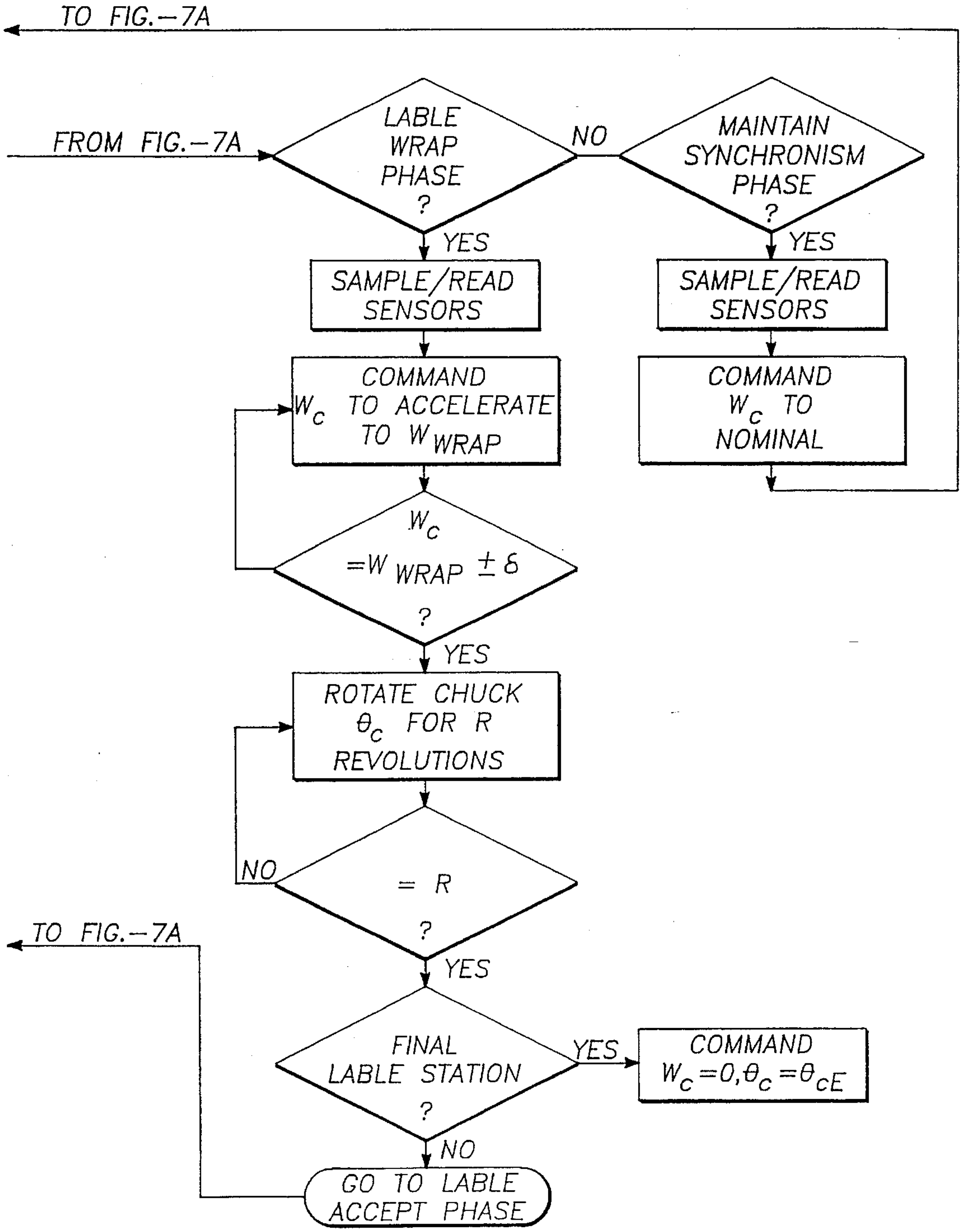

Referring now to FIG. 7, the control system is described in terms of an embodiment of a two labeling station turret type labeling apparatus similar to that illustrated in FIGS. 3 and 5. The flow chart diagram of FIG. 7 illustrates three primary phases of operation. There is an initial synchronization phase during which the control system commands the several motors to operate at or near their nominal velocity values, and to align their shafts to some nominal set of angular orientations. While the initial synchronization step may not be necessary to the operation of the labeling apparatus, its inclusion substantially eliminates the possibility that a characteristic of some component, such as the orientation of a motor shaft, will be incorrect and not correctable in the available time at a critical phase of labeling. Sufficient time is allocated to the initial synchronization phase so as to virtually guarantee synchronization, barring component malfunction.

During the initial synchronization, all of the sensors 18, 31, 211 are read or sampled via the input interface 101. Their values are then evaluated against some standard or nominal parameters and appropriate commands, in the form of number and frequency of pulses are sent to the stepper motors via an output interface 105 and output driver 106. The output driver 106 may comprise the stepper motor controller and operate to translate commands from the computer 20 into an equivalent pulse sequence.

After the initial synchronization, there are three possible phases in which a container 15 mounted to a chuck 14 may be in. Referring to FIG. 3, a container in position 1 is approaching the front labeling station drum 35F. It will be realized that the container positions are part of a continuous movement of the containers around the turret. The chuck motor 17 and the vacuum motor 211 must enter this phase sufficiently prior to tangent contact so that the desired angular speed and orientation can be achieved for all anticipated post-synchronization initial conditions. It is desirable to match angular velocities in order to minimize relative slipping, possible component ware, and label damage. It is desirable to match the angular orientation of the chuck 14 with its oriented container 15 with vacuum drum 35F so that the label is positioned properly on the surface of container 15. For a single labeling station system such as that in FIG. 2, the orientation of the container may not be important if the container is rotationally symmetrical.

The container at location 2 receives the label 36F, and maintains its matching speed until the trailing edge of the label has left the vacuum drum. The label wrap phase may begin at this time. The wrap phase comprises an acceleration of the chuck motor 17 to a desired wrapping velocity. Once this velocity has been achieved, as determined from the chuck sensor 18, the wrapping velocity is maintained for a fixed number of revolutions, or equivalently, for a fixed period of time. A pressure source such as a roller 202, or a linear wiping arm, or a directed stream of compressed air cooperates with the spinning container and unattached trailing label edge to urge it to the container surface. Upon contact the label is secured by the previously applied adhesive. The number of revolutions R, needed to complete the high speed wrapping is predetermined and part of the control program. One complete rotation is sufficient when the pressure device is used; a greater number of revolutions may be necessary tow rap the label absent a pressure device when the wrapping is accomplished by spinning at high speed.

The processing of the container subsequent to wrapping will depend on which label wrapping step has been completed. If the second label step has been completed, such as when the back label 36B has been applied, then the chuck motor 17 may be commanded to decelerate in preparation for the container 15 removal from the turret. If the container is at position 4 in FIG. 3, then it must be prepared for its second labeling operation. As previously described this requires a coordination of angular velocities and orientations to effect substantially slipless labeling and proper placement of the label.

At times other than the label accept phase, the label wrap phase, and the chuck motor deceleration phase, the chuck motor velocity and orientation are not critical and they may generally be commanded to maintain a nominal chuck motor angular velocity. The relative angular orientation during this phase is monitored but need not be corrected. This velocity maintenance phase is generally present prior to the label acceptance phase and between the label accept phase and the label wrap phase. The initiation and completion of the several phases is predetermined based on the characteristics of the container 15 and turret apparatus operating characteristics. The phase must be initiated sufficiently prior to the action to permit the desired velocity and orientation to be achieved.

In an embodiment of the present invention for applying multiple labels to non-cylindrical containers the required control may be somewhat more complex. For example with reference to FIG. 4, a somewhat different control approach may be advantageously used. The rectangular shape of the containers has two impacts on the control system. First, spinning the containers to facilitate wrapping may not be entirely effective because of the potentially unfavorable air currents set up by a spinning nonsymmetrical container. Second, the rectangular container shape defines a different distance from the center of the turret as each container face is presented for labeling. These two differences from a cylindrical labeling apparatus require a more general approach to container orientation than for a cylindrical container but which is also applicable to the cylindrical containers.

Operation of the system is based on controlling the angular orientation of each chuck motor 17 as a function of the relative angular orientation of the turret. In reference to the labeling operation in FIG. 4, a rectangular container is shown at position 1. This container has been orientated by appropriate commands to its chuck motor 17 so as to present a desired location of the desired container face A to the vacuum drum 40F for labeling. While the container at 1 is not spinning in the sense that the cylindrical container was caused to spin, its angular orientation is controlled, such as by rocking (partially rotating) the container toward the vacuum drum 40F at the proper instant to accept the label leading edge 41F and rocking away from the drum a moment later so as to accept the label without scraping the vacuum drum 40F. The container may be continuously steered so as to clear the vacuum drum 40F. Note that the vacuum drum may not generally be placed at the minimum container tangent point and that different vacuum drums may necessarily be placed at different distances from the turret, or from the centerline of the transport path, to facilitate labeling different container faces.

The ability to continuously steer the container also permits reorientation of the container for a subsequent labeling operation on a different face. For example, in FIG. 4, container 2 is being rotated clockwise so as to present the appropriate face for labeling at vacuum drum 40B.

The steering also permits a pressure device such as spring loaded roller 240B that is illustrated at position 4 to be used to urge the adhesive covered label onto the surface of the container. The orientation of the container may be adjusted as the container passes the pressure application station 240B so that a relatively constant pressure is maintained. Other pressure devices such as a linear wiper arm, a brush, or a stream of directed compressed air may also be used to urge the label to contact the surface of the container.

Stepper type motors are used for chuck motors 17 for this implementation because the stepper motors can be easily commanded to change orientation in step increments. In this embodiment, for each angular orientation of the turret, the chuck motor 17 is commanded to a particular angular orientation. The 360 degree rotation of the turret may be divided into zones having different precision requirements. For each increment of turret position, or for each zone of increments of turret position when appropriate, a desired value of chuck angular orientation and velocity is stored in a memory storage device. This sequence of positions or commands to achieve these positions is stored in memory and is retrieved from memory and issued to the chuck motor 17 at the appropriate time. Some prediction and correction schemes for closed loop control systems may be utilized to minimize the computations when desirable. Methods of implementing predictor/corrector control systems are known in the art. Only one stored sequence of positions is required for all the chuck motors since they all traverse the same sequence of commands at different times. Turret sensor 31 is used to verify turret location at any time, and corrections may be made. Chuck sensors 18 are read to verify that the commanded orientations are achieved. The control of the vacuum drums is substantially the same as for the cylindrical labeling apparatus of FIGS. 3 and 7 relative to the synchronization phase and the label accept phase. Synchronism is then maintained substantially continuously, and the label wrap phase is subsumed into the chuck motor steering as a function of turret angular orientation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be designed by the claims appended hereto and their equivalents.

What is claimed is:

1. A computer controlled turret type labeling apparatus having a label applying mechanism for applying labels to containers, comprising:

turret means, having motor means for driving said turret means and sensor means for providing information about said turret means, for maintaining at least one container handling station;

each container handling station having motor means and sensor means, said motor means driving said container handling station and said sensor means providing information about said container handling station; and computer means coupled to said turret means and each container handling station for processing said information received from said turret sensor means and said container handling station sensor means to compute speed, direction, and position status of said turret means and each said container handling station, and for generating control signals in response to said computed status to drive said turret motor means and said container handling station motor means to predetermined locations and rotational orientations and at predetermined speeds as a function of time, based on said processed information, to effect labeling of containers;

said computer means being programmable to so that said control signals generated in response to the computed status are adaptable to the size and shape of the container, a desired label application point, and characteristics of the label.

2. The apparatus of claim 1, wherein said motor means drive said turret means and said container handling stations by rotating said turret means and said container handling stations.

3. A computer controlled labeling apparatus for applying labels to objects, comprising:

at least one means for applying labels;

means for transporting objects along an arbitrary predetermined path, said means for transporting objects being in spaced relation to said at least one means for applying labels, said means for transporting being responsive to control signals;

means for sensing status of said means for transporting including status respective of speed, direction, and position and generating first sensed status signals;

means for orienting said objects, said means for orienting being responsive to time varying control signals commanding angular position, angular velocity, and rotational direction simultaneously at a specified time;

means for sensing status of said means for orienting objects including status respective of speed, direction, and position and generating second sensed status signals;

means for processing said first and second sensed status signals and generating said control signals so that said means for transporting and said means for orienting objects are driven to predetermined locations and at predetermined orientations and speeds as a function of time to effect labeling of said objects.

4. The apparatus of claim 3, wherein said means for transporting comprises a motor driven substantially circular turret.

5. The apparatus of claim 3, wherein said means for orienting objects comprises a motor.

6. The apparatus of claim 5, wherein said means for orienting objects is a stepper motor.

7. In a computer controlled labeling apparatus comprising a computer, means for transporting objects, means for orienting objects, and means for applying labels to objects; a method of applying labels to objects comprising the steps of:

mathematically characterizing attributes of said means for transporting objects, said means for orienting objects, said means for applying labels, said object, and said label;

transporting said object along a predetermined path in spaced relation to said means for applying labels;

sensing the velocity and position of said means for transporting;

sensing the velocity and orientation of said means for orienting;

computing control values including control values specifying position, rotational direction, and rotational speed for matching the angular orientation and angular velocity of said means for orienting to predetermined values at each of a plurality of positions along said predetermined transport path based on said mathematical characterization, said sensed velocity and orientation of said means for orientating and said sensed velocity and position of said means for transporting;

generating control signals including control signals commanding position, rotational direction, and rotational speed in response to said computed control values;

applying said control signals to said means for transporting, said means for orientating, and said means for applying label so that said label is applied to said object at the correct location on the object and the velocity of said object at the label application location at the matched to the velocity of means for applying label.

8. In a computer controlled labeling apparatus comprising a computer, a motor driven rotatable turret for transporting an object to be labeled, at least one motor driven chuck for orienting said object, at least one motor driven rotatable labeling means, and turret motor sensor, chuck motor sensor, and labeling means sensor for determining an angular orientation and velocity of each said motor; a method of applying at least one label to said object with an adhesive comprising the steps of:

applying a first label to said object, including the steps of:

reading said chuck sensor, turret sensor, and first label means sensor to determine a velocity and orientation value for each of said motors;

predicting, based on said sensor velocity and orientation values prior to said chuck arriving at the first label application point, the relative angular orientations and angular velocities of said turret, chuck, and first labeling means at the time the object will arrive at the first label application point;

generating and applying velocity and orientation correction signals to each said chuck motor and first labeling means motor, prior to the time and location said object arrives at the first point of label application, to achieve a predetermined first angular orientation and first angular velocity of said object for wrapping a first label on said object without slipping or stretching said first label when said object reaches the first label application point; and maintaining the predetermined first wrapping angular velocity for a fixed number of revolutions of said object, or equivalently, for a fixed first period of time so that the first label is wrapped about said object in a controlled manner.

9. The method of claim 8, further comprising the step of initializing said labeling apparatus before said step of applying said label by synchronizing the velocities and angular orientations of said turret, chuck, and labeling means motors by:

applying control signals to said turret, chuck, and labeling means motors for a predetermined period of time to drive said motors to respective predetermined angular velocities near the angular velocities at which said motors are intended to operate when said labels are applied to said object and to align each motor shaft of said respective motors to an orientation near the desired angular orientation of each said shaft when said labels are applied;

reading said chuck sensor, turret sensor, and label means sensor to determine a velocity and orientation value for each said motor;

comparing said turret, chuck, and labeling means sensor values with predetermined values;

computing correction factors in said computer for synchronizing velocities and orientations of said turret, chuck, and labeling means; and generating and applying command signals to each said turret motor, chuck motor, and labeling means motor based on said correction factors that synchronize said turret, said chuck, and said labeling means.

10. The method as in claim 9, further comprising the step of applying a pressure to said label to urge said label into contact with the surface of the object so that the label remains attached to the object with adhesive previously applied to the container or to the label.

11. The method as in claim 9, wherein said motors are stepper motors and wherein said command signals to each said stepper motor comprise a plurality of pulses which are timed to achieve the desired initial velocity and orientation.

12. The method as in claim 9, wherein at least two labels are applied to said object at different label application points, and wherein the method further comprises the steps of:

commanding said turret to advance the object to the second labeling means;

applying a second label to said object, including the steps after applying said first label of:

reading said chuck sensor, turret sensor, and second label means sensor to determine a velocity and orientation value for each of said motors;

predicting, based on said sensor velocity and orientation values prior to said chuck arriving at the second label application point, the relative angular orientations and angular velocities of said turret, chuck, and second labeling means at the time the object will arrive at the second label application point;

generating and applying velocity and orientation correction signals to each said chuck motor and second labeling means motor, prior to the time and location said object arrives at the second point of label application, to achieve a predetermined second angular orientation and second angular velocity of said object for wrapping a second label on said object without slipping or stretching said second label when said object reaches the second label application point; and maintaining the predetermined second wrapping angular velocity for a fixed number of revolutions of said object, or equivalently, for a fixed second period of time so that the second label is wrapped about said object in a controlled manner.

13. The method as in claim 9, wherein said step of generating and applying velocity and orientation correction signals comprises continuously steering said chuck by commands to said chuck motor to control the angular orientation and velocity of said chuck so that the object mounted to said chuck is positioned adjacent the label application point of the labeling means at a predetermined time and at a predetermined velocity to receive the label from the labeling means so that said labeling apparatus is capable of applying labels to cylindrical and non-cylindrical objects.

14. The method as in claim 13, wherein said step of generating and applying velocity and orientation correction signals further comprises continuously steering said labeling means by commands to said labeling means motor to control the angular orientation and velocity of said labeling means so that the label is applied to the object mounted to said chuck at the proper predetermined location on the object without slipping and without stretching the label at the application point of the labeling means at a predetermined time and at a predetermined velocity to receive the label from the labeling means.

15. The method as in claim 14, wherein said step of generating and applying velocity and orientation correction signals further comprises continuously steering said chuck to reorient the object for a subsequent labeling operation on a different surface area of said object.

16. The method as in claim 14, further comprising the step of applying a pressure with a pressure applying device to regions of said adhesive label after application to said object to urge said adhesive label into substantially permanent contact with the surface of the object; and wherein said method further comprises the step of steering said chuck motor to provide a substantially constant pressure force by said pressure applying device against said label.

17. The method as in claim 9, further comprising the steps of:

pre-storing said predetermined values of chuck angular orientation and chuck angular velocity for corresponding values of turret orientations in a memory storage device coupled to said computer;

recalling said predetermined values from said memory during operation of said labeling apparatus; and using said pre-stored predetermined values in said step of comparing said turret, chuck, and labeling means sensor values.

18. The method as in claim 17, further comprising the step of controlling the separation distance between the axis of rotation of said chuck and said labeling means by moving said labeling means relative to said turret rotational axis so that the distance from said object to said labeling means can be varied to accommodate irregularly shaped non-cylindrical objects.

19. A computer controlled labeling apparatus for applying labels to objects, said labeling apparatus comprising:

a computer;

memory means for pre-storing predetermined values of chuck angular orientation and chuck angular velocity for corresponding values of turret orientations coupled to said computer;

a motor driven rotatable turret for transporting an object to be labeled;

a motor driven chuck for holding and orienting said object;

at least one motor driven rotatable vacuum drum labeling means;

a turret motor velocity and angular position sensor coupled to said computer;

a chuck motor velocity and angular position sensor coupled to said computer;

a labeling motor velocity and angular position sensor coupled to said computer;

means for reading said chuck sensor, turret sensor, and labeling means sensor to determine a velocity and orientation value for each of said motors;

means for predicting, based on said sensor velocity and orientation values prior to said chuck arriving at the first label application point, the relative angular orientations and angular velocities of said turret, chuck, and first labeling means at the time the object will arrive at the first label application point;

means for generating and applying velocity and orientation correction signals to each said chuck motor and first labeling means motor, prior to the time and location said object arrives at the first point of label application, to achieve a predetermined first angular orientation and first angular velocity of said object for wrapping a first label on said object without slipping or stretching said first label when said object reaches the first label application point; and means for maintaining the predetermined wrapping angular velocity for a fixed number of revolutions of said object, or equivalently, for a fixed first period of time so that the first label is wrapped about said object in a controlled manner.

20. The apparatus as in claim 19, further comprising means for initially synchronizing the velocities and angular orientations of said turret, chuck, and labeling means motors including:

means for applying control signals to said turret, chuck, and labeling means motors for a predetermined period of time to drive said motors to respective predetermined angular velocities near the angular velocities at which said motors are intended to operate when said labels are applied to said object and to align each motor shaft of said respective motors to an orientation near the desired angular orientation of each said shaft when said labels are applied;

means for reading said chuck sensor, turret sensor, and label means sensor to determine a velocity and orientation value for each said motor;

means for comparing said turret, chuck, and labeling means sensor values with predetermined values;

means for computing correction factors in said computer for synchronizing velocities and orientations of said turret, chuck, and labeling means; and means for generating and applying command signals to each said turret motor, chuck motor, and labeling means motor based on said correction factors that synchronize said turret, said chuck, and said labeling means.

21. The apparatus as in claim 20, wherein said means for generating and applying velocity and orientation correction signals comprises means for continuously steering said chuck by commands to said chuck motor to control the angular orientation and velocity of said chuck so that the object mounted to said chuck is positioned adjacent the label application point of the labeling means at a predetermined time and at a predetermined velocity to receive the label from the labeling means so that said labeling apparatus is capable of applying labels to cylindrical and non-cylindrical objects.

22. The apparatus as in claim 21, wherein said motors are stepper motors and wherein said command signals to each said stepper motor comprise a plurality of pulses which are timed to achieve the desired initial velocity and orientation.

23. The apparatus as in claim 20, wherein said means for generating and applying velocity and orientation correction signals further comprises means for continuously steering said labeling means by commands to said labeling means motor to control the angular orientation and velocity of said labeling means so that the label is applied to the object mounted to said chuck at the proper predetermined location on the object without slipping and without stretching the label at the application point of the labeling means at a predetermined time and at a predetermined velocity to receive the label from the labeling means.

24. The apparatus of claim 3, wherein said means for transporting comprises a motor driven transport apparatus having a substantially linear path section.

* * * * *